United States Patent
Bathelier et al.

(10) Patent No.: US 9,902,128 B2
(45) Date of Patent: Feb. 27, 2018

(54) METHOD OF MANUFACTURING A PIECE OF INTERIOR EQUIPMENT OF AN AUTOMOTIVE VEHICLE

(71) Applicant: FAURECIA AUTOMOTIVE INDUSTRIE, Nanterre (FR)

(72) Inventors: Xavier Bathelier, Saint Pierremont (FR); Daniel Baudet, Mouzon (FR); Denise Medina, Mouzon (FR)

(73) Assignee: Faurecia Automotive Industrie, Nanterre (FR)

(*) Notice: Subject to any disclaimer, the term of this patent is extended or adjusted under 35 U.S.C. 154(b) by 0 days.

(21) Appl. No.: 15/272,184

(22) Filed: Sep. 21, 2016

(65) Prior Publication Data
US 2017/0080679 A1 Mar. 23, 2017

(30) Foreign Application Priority Data
Sep. 22, 2015 (FR) ..................... 15 58937

(51) Int. Cl.
*B32B 5/26* (2006.01)
*B32B 5/02* (2006.01)
(Continued)

(52) U.S. Cl.
CPC ............. *B32B 5/26* (2013.01); *B32B 5/02* (2013.01); *B32B 5/022* (2013.01); *B32B 5/06* (2013.01);
(Continued)

(58) Field of Classification Search
CPC .......... B32B 2250/02; B32B 2250/20; B32B 2255/02; B32B 2255/26; B32B 2471/02;
(Continued)

(56) References Cited

U.S. PATENT DOCUMENTS

| 2,543,101 A * | 2/1951 | Francis ,Jr. ............ D21H 27/34 112/80.7 |
| 4,424,250 A | 1/1984 | Adams et al. |

(Continued)

FOREIGN PATENT DOCUMENTS

| DE | 4409771 A1 | 10/1994 |
| DE | 19812925 A1 | 9/1999 |

(Continued)

OTHER PUBLICATIONS

French Search Report in French for application No. FR1558937, dated Jul. 12, 2016, 2 pages.

*Primary Examiner* — Arti Singh-Pandey
(74) *Attorney, Agent, or Firm* — Reising Ethington P.C.

(57) ABSTRACT

A method for manufacturing a piece of interior equipment of an automotive vehicle includes: obtaining a first web of fibers on a conveyor, the first web including a first layer of fibers forming a sole, and a second layer of fibers intended to form a velvet; depositing a second web of fibers and obtaining an assembly; needling the assembly; heating the needled assembly to a heating temperature, and obtaining a coating; and thermoforming the coating and a lower portion at a forming temperature in order to obtain the piece. The second web has continuous fibers with a single component having a melting temperature, the assembly further including a binding layer deposited on the sole of the first web, the binding layer in majority including at least one thermoplastic polymer having a melting temperature greater than the forming temperature and less than the melting temperature of the single component.

10 Claims, 2 Drawing Sheets

(51) Int. Cl.
- *B32B 5/06* (2006.01)
- *B32B 7/12* (2006.01)
- *B60R 13/02* (2006.01)
- *D04H 1/435* (2012.01)
- *D04H 1/488* (2012.01)
- *D04H 1/498* (2012.01)
- *D04H 1/56* (2006.01)
- *D04H 11/08* (2006.01)
- *D06N 7/00* (2006.01)
- *B60N 3/04* (2006.01)
- *D04H 1/485* (2012.01)
- *D04H 1/558* (2012.01)
- *D04H 1/559* (2012.01)

(52) U.S. Cl.
CPC ............ *B32B 7/12* (2013.01); *B60N 3/042* (2013.01); *B60R 13/02* (2013.01); *D04H 1/435* (2013.01); *D04H 1/485* (2013.01); *D04H 1/488* (2013.01); *D04H 1/498* (2013.01); *D04H 1/558* (2013.01); *D04H 1/559* (2013.01); *D04H 1/56* (2013.01); *D04H 11/08* (2013.01); *D06N 7/0068* (2013.01); *D06N 7/0081* (2013.01); *B32B 2250/00* (2013.01); *B32B 2250/02* (2013.01); *B32B 2250/20* (2013.01); *B32B 2255/02* (2013.01); *B32B 2255/26* (2013.01); *B32B 2471/02* (2013.01); *B32B 2605/00* (2013.01); *B32B 2605/003* (2013.01); *D10B 2505/08* (2013.01); *D10B 2505/12* (2013.01)

(58) Field of Classification Search
CPC ..... B32B 2605/003; B32B 5/022; B32B 5/06; B32B 5/26; B32B 7/12; B32B 2250/00; B32B 2605/00; B32B 5/02; B60R 13/02; D04H 11/08; D04H 1/435; D04H 1/488; D04H 1/498; D04H 1/56; D04H 1/485; D04H 1/558; D04H 1/559; D10B 2505/12; D10B 2505/08; B60N 3/042
See application file for complete search history.

(56) References Cited

U.S. PATENT DOCUMENTS

| | | |
|---|---|---|
| 5,387,454 A | 2/1995 | Werner |
| 6,548,141 B2 | 4/2003 | Nagata et al. |

FOREIGN PATENT DOCUMENTS

| | | |
|---|---|---|
| EP | 0902115 A2 | 3/1999 |
| EP | 2050850 A1 | 4/2009 |
| GB | 2118484 A | 11/1983 |
| JP | H07268761 A | 10/1995 |

\* cited by examiner

METHOD OF MANUFACTURING A PIECE OF INTERIOR EQUIPMENT OF AN AUTOMOTIVE VEHICLE

BACKGROUND OF THE INVENTION

1. Field of the Invention

The present invention relates to a method for manufacturing a piece of interior equipment of an automotive vehicle from at least two fiber webs.

2. Description of Related Art

Carpets used in automobiles as flooring are essentially needled carpets of the "flat needled" or needled "Dilour®" type. These carpets belong to the family of non-woven fabrics. They are preferred to traditional woven coatings, since they are deformable and may fit the shapes of the floors of vehicles. The shaping of the floor carpets for fitting the configuration of the floors of the vehicles is achieved by thermoforming. As these carpets are generally associated with sub-layers (heavy masses or felts) for generating an acoustic complex allowing acoustic isolation or absorption, thermoforming take place at the softening temperature of these under-layers, for example from 110° C. in the case when the under-layer is a heavy mass based on polyolefin.

The "Dilour®" needled fabrics are also called "needled velvet", since their surface aspect is related to that of a velvet. This velvet in this case consists of fibers as individual loops or fibers (shorn loops).

These carpets are made from a web of fibers (called a precursor web having undergone first needling called pre-needling), for example on a "Dilour®" machine consisting of a conveyor equipped with an assembly of brushes and a needling head equipped with needle plates (also called combs). These needles carry away a portion of the fibers of the web as far as the inside of the brushes of the conveyor over a depth corresponding to the height of the velvet of the finished product. This step is sometimes called "dilouring".

Simultaneously with the formation of the velvet, the needling densifies the web by contributing to the entanglement of the fibers in the portion of the web, called "a sole", remaining on the surface of the brushes. Thus, the thickness of the sole is gradually reduced as the fibers entangle with each other.

The velvet is then shorn in a step immediately following the "dilouring", the height of the loops of the velvet being shaved. The constitutive fibers of the velvet then generally have the shape of a "U", the base of the "U" being found in the sole.

In order to improve the useful velvet density of this type of carpets, the use of a machine "Dilour IV" i.e. a "Dilour®" machine having two needling heads operating on a common conveyor with brushes is known. Two webs are associated, one passing under the first head, to which a second web is affixed at the inlet of the second head. The needling density resulting from this is improved as compared with a simple "Dilour®" machine and gives the possibility of attaining a desired velvet density and of improving the resistance to abrasion.

Nevertheless, if an acceptable velvet density is obtained with this method, it requires a relatively high weight of fibers. This is due to the fact that the webs made by carding/batting are no longer homogenous below a certain weight, which leads to weakened areas at the moment of the thermoforming causing tears in the coating.

Moreover, the orientation of this type of web is not anisotropic because of the batting which gives preference to the transverse direction relatively to the conveying direction.

A significant stretch in the longitudinal direction therefore risks leading to tears, and this all the more so since it coincides with a weakened area.

Also, the weight of these products rarely falls to below 600 g/m².

Generally, the carpets formed by needling are consolidated by a resin which binds together the fibers in the sole. Indeed, the mechanical cohesion provided by the needling sometimes proves to be insufficient for guaranteeing good behavior during use in the vehicle (in particular, abrasion resistance, defibration . . . ).

These resins are customarily lattices of the SBR (Styrene Butadiene Rubber) type and are applied on the back of the carpet as an aqueous dispersion by known coating means, followed by squeezing for having the dispersion penetrate into the sole. The carpets are then dried in ovens for discharging the water. The surface mass of the dry extract of latex remaining in the sole after drying represents between 15 to 30% of the surface mass of the web.

The use of latex has disadvantages, since the penetration of the dispersion inside the sole is difficult to control (the sole should not be crossed by any means, which would pollute the fibers in the velvet), partly because of the capillarity phenomena due to the fiber network by its randomness. Moreover, lattices are thermoset (or cross-linked) polymers which are difficult to recycle, and the latex residues should be stored, since they are potentially dangerous for the environment.

More and more frequently, for environmental reasons, this binding by latex coating (generally thermoset and non-recyclable SBR resin) has been replaced with binding by melting of fibers having a melting point less than the majority fiber. These meltable fibers, so-called binding fibers, are generally two-component fibers, advantageously having a core in a given polymer and a sheath in a co-polymer with a lower melting point, for example a core in PET (polyethylene terephthalate) melting at 250° C. and a sheath in co-PET (co-polyethylene terephthalate) melting at 120° C. Thus, a mixture specific to the production of such a textile coating will for example consist of 90% of PET fibers and of 10% of a two-component PET and Co-PET fiber.

The binding by meltable fibers takes place in an oven, for example with a crossing air flow, or else by calendaring (often both of these operations are combined) after the needling operation, since the coating should acquire all its resistance before the subsequent operations, for example shearing and lining with an acoustic sub-layer, generally a heavy mass (a film generally based on polyolefin polymer strongly loaded with chalk or barite).

At this stage, the polymer with a low melting point of the binding fibers has therefore melted and generated binding points between the fibers essentially in the sole of the product.

Moreover, this type of coating should be thermoformable, i.e. it should be able to fit the shape of the floor of an automobile and therefore be able to undergo relative elongations up to 30%.

Now, it was realized that consolidation with binding fibers does not allow the coating to attain the same performances, once it is thermoformed, as a latex coating. If the abrasion resistance before thermoforming is compliant with specifications, it is generally no longer compliant after thermoforming.

This difference is explained by the fact that the elongation strength of latex products is greater than that of products bound by meltable fibers. Thus, at the thermoforming, in the strongly stressed areas, like the foot cavities (portions of the flooring located in front of the seats), the products bound by meltable fibers stretch more than latex products, and had a lesser surface mass. Samples taken in this area, tested in abrasion, therefore have much lower performances than those of latex products.

This again forces an increase in the weight of the product, which reduces or has this technology lose its economical interest.

Document U.S. Pat. No. 8,287,983 describes a coating, called "Lutraflor" which gives the possibility of attaining very low weight levels, by the use as a second web of a spunbond (a term designating a layer of coated continuous filament layer, extruded straightaway, and then bound together by calendaring) having two-component Co-PET/PET filaments. Such a web allows binding of the fibers by melting of Co-PET without using any latex.

However, the extrusion of two-component filaments is more delicate to carry out than the extrusion of filaments with a single component. The productivity is therefore less. A coating integrating a second web of the spunbond type with a two-component filament is therefore lighter, but its cost is identical, or even greater than that of the conventional product because of this delicate production. The reduction in the weight allowed by this product is not sufficient to make it economically very interesting.

Further, the mechanical strength and the dimensional stability of such a coating appear to be less than those of coatings including latex.

An object of the invention is to find a remedy to all or part of the drawbacks above, i.e. in particular to obtain at a lower cost, and with simple pieces of equipment, pieces of interior equipment of an automotive vehicle having a very satisfactory velvet aspect layer, an adequate elongation and abrasion strength, without any latex coating, and for which the specific weight remains low.

SUMMARY OF THE INVENTION

For this purpose, the invention relates to a method for manufacturing a piece of interior equipment of an automotive vehicle including the following steps, in this order:
  obtaining a first web of discontinuous fibers on a conveyor equipped with brushes, the first web including a first layer of fibers forming a sole, and a second layer of fibers intended to form a velvet and located on the side of the conveyor relatively to the sole,
  depositing a second web of fibers and obtaining an assembly including the first web and the second web,
  needling the assembly on the conveyor so as to entangle fibers of the second web with fibers of the sole of the first web and obtaining a needled assembly,
  heating the needled assembly to a heating temperature (TC), and obtaining after cooling, a coating, and
  thermoforming the coating and a lower portion attached on the second web, the thermoforming being carried out at a forming temperature (TF), in order to obtain the piece,
  wherein the second web comprises continuous fibers with a single component having a melting temperature (T1), the obtained assembly further including a binding layer deposited on the sole of the first web, the binding layer in majority including at least one thermoplastic polymer having a melting temperature (TL) greater than the forming temperature (TF) and less than the melting temperature (T1), the second web being deposited on the binding layer, the heating temperature (TC) being greater than the melting temperature (TL), or the second web comprises discontinuous fibers, the discontinuous fibers including base fibers and between 25% and 75% by masse of binding fibers at least partly meltable comprising a thermoplastic polymer having a melting temperature (TL2) greater than the forming temperature (TF), the base fibers having a melting temperature (T2) greater than the melting temperature (TL2) of said thermoplastic polymer, the heating temperature (TC) being greater than the melting temperature (TL2).

According to particular embodiments, the method comprises one or several of the following features, taken according to all the technically possible combinations:
  the melting temperature (TL) is greater than the forming temperature (TF) by at least 30° C., and less than the melting temperature (T1) by at least 30° C., the heating temperature (TC) being greater than the melting temperature (TL) by at least 30° C., or the melting temperature (TL2) is greater than the forming temperature (TF) by at least 30° C., the melting temperature (T2) being greater than the melting temperature (TL2) of said thermoplastic polymer by at least 30° C., the heating temperature (TC) being greater than the melting temperature (TL2) by at least 30° C.;
  the first web comprises between 5% and 10% by mass of binding fibers at least partly meltable at said heating temperature (TC) and at said forming temperature (TF);
  the binding fibers are two-component fibers, one of the two components having a melting temperature greater than the forming temperature (TF);
  the step for obtaining the first web comprises a sub-step for needling, before depositing the binding layer, in order to form the second layer of fibers;
  the binding layer comprises a film or a non-woven fabric, the film or the non-woven comprising the thermoplastic polymer;
  the binding layer in majority comprises co-polyethylene terephthalate, polyethylene, ethylene-vinyl acetate, polyamide, polypropylene or mixtures thereof;
  the fibers of the second web are made in polyethylene terephthalate, in polypropylene, in polyamide, in polylactic acid, or mixtures thereof; and
  the binding fibers of the second web in majority comprise a polymer taken from among co-polyethylene terephthalate, polyethylene, ethylene-vinyl acetate, polyamide, polypropylene or mixtures thereof.

The invention also relates to a piece of interior equipment for an automobile including:
  a first web of discontinuous fibers including a first layer of fibers forming a sole, and a second layer of fibers forming a velvet,
  a second web of fibers, fibers of the second web being entangled with fibers of the sole of the first web, and
  a lower portion attached on the second web,
  the piece further comprising a binding layer attached on the sole of the first web, the second web being attached on the binding layer, and in majority comprising continuous fibers with a single component having a melting temperature (T1), the binding layer in majority including at least one thermoplastic polymer having a melting temperature (TL) less than the melting temperature (T1), or
  the second web in majority comprising discontinuous fibers, the discontinuous fibers including base fibers and between 25% and 75% by mass of binding fibers at least partly meltable comprising a thermoplastic polymer having a melting temperature (TL2), the base fibers having a melting temperature (T2) greater than the melting temperature (TL2) of said thermoplastic polymer.

BRIEF DESCRIPTION OF THE DRAWINGS

The invention will be better understood upon reading the description which follows, only given as an example and made with reference to the appended drawings, wherein.

DETAILED DESCRIPTION

Example 1

Figure 1:
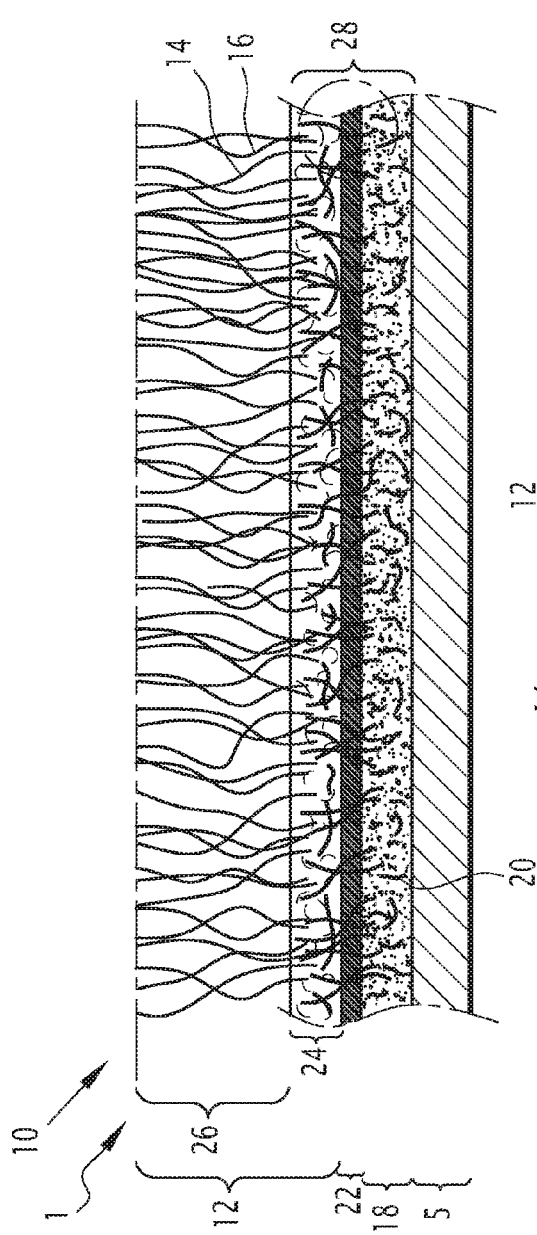
FIG. 1 is a schematic sectional view of a piece of equipment according to an embodiment of the invention.
Figure 2:
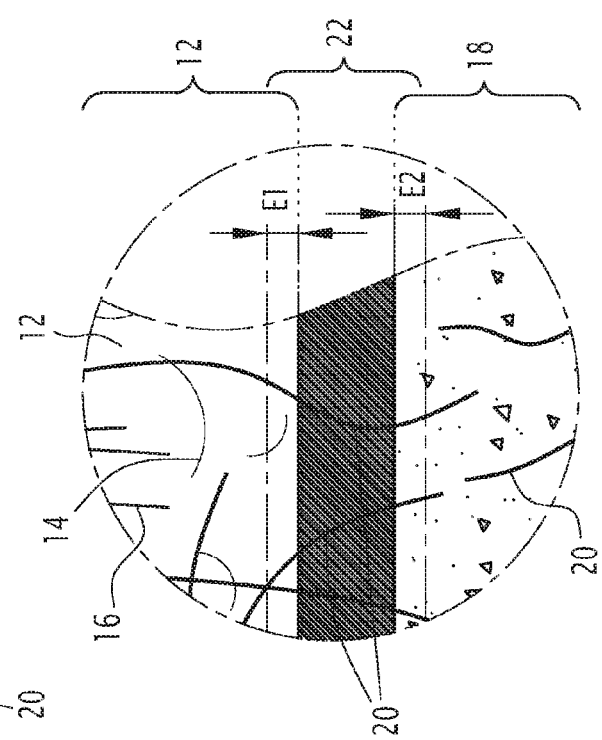
FIG. 2 is a detail of FIG. 1 at the binding layer of the piece.

A portion of a piece 1 of interior equipment of an automotive vehicle is illustrated in FIGS. 1 and 2. The portion for example extends in an extension plane P and is illustrated as a section along a sectional plane P' perpendicular to the extension plane.

The piece 1 is for example a carpet of an interior equipment of an automotive vehicle. The piece 1 is for example intended to be laid on the floor or on a wall of the vehicle. The piece 1 consists of a textile coating 10 and of a lower portion 5.

The lower portion 5 is for example a heavy mass based on polyolefins allowing phonic insulation or a felt in the case when the phonic absorption is preferred.

The thickness of the coating 10, perpendicularly to the extension plane P, is greater than 1 mm and is for example comprised between 3 mm and 10 mm. The surface mass of the coating 10 is less than the 2,000 g/m$^2$ and notably comprised between 400 g/m$^2$ and 1,000 g/m$^2$.

The coating 10 includes a first web 12 of discontinuous and needled fibers, a second web 18 of continuous fibers 20 positioned parallel to the first web, and a binding layer 22 extending between the first web and the second web and mechanically connecting them together.

By "web", is meant a layer of fibers obtained by carding/batting.

The coating 10 is advantageously without any latex.

The first web 12 comprises base fibers 14 and binding fibers 16.

The first web 12 includes a first layer of fibers 24 forming a sole extending in the extension plane P, and a second layer of fibers 26 forming a velvet from the sole on the side of the coating 10 intended to be visible by a user (not shown) of the automobile.

The velvet consists of fibers 14, 16 as loops or individual fibers (shorn loops).

The thickness of the velvet is advantageously greater than that of the sole. The velvet layer advantageously has a thickness comprised between 2 mm and 5 mm. The density of the velvet is preferably comprised between 0.03 g/cm$^3$ and 0.06 g/cm$^3$. Such a density ensures a nice aspect and good resistance to abrasion.

This density is for example measured by determining the ratio between the weight of the obtained material by shearing the totality of the velvet down to the sole, added to the initial volume of the velvet layer.

The sole of the first web 12 is in the form of a flat needled fabric.

The surface mass of the sole is greater than 50 g/m$^2$, and is notably comprised between 50 g/m$^2$ and 200 g/m$^2$.

The fibers 14, 16 form a "U", the base of which is located in the first layer 24 and the ends in the second layer 26 for forming the velvet. Thus, the fibers 14, 16 are at least partly bound together in their portions contained in the first layer of fibers 24.

The base fibers 14 are made on the basis of a thermoplastic polymer, advantageously in PET (polyethylene terephthalate). Alternatively, they are in polypropylene, polyamide, polylactic acid, mixtures thereof or mixtures thereof with PET. The base fibers 14 are for example in majority in the first web 12.

In the present application, by "majority" is meant at least 50% by mass, preferably at least 90% by mass.

The length of the base fibers 14 is generally comprised between 40 mm and 100 mm. Their titer is advantageously comprised between 3.3 dtex and 25 dtex.

The binding fibers 16 are at least partly meltable. They generally comprise two-component fibers for example comprising a core and an outer sheath surrounding the core. The outer sheath has a melting temperature less than the melting temperature of the core.

For example, the core is made in polyethylene terephthalate and the sheath in co-polyethylene terephthalate.

Alternatively, the binding fibers 16 consists of a single polymer, having a melting point less than the melting point of base fibers 14, advantageously less than about 100° C. than the melting point of the base fibers 14. The polymer of the binding fibers 16 for example then has a melting temperature from 110° C. Indeed, the layer 12 not participating or only slightly in the resistance to elongation at the moment of the forming, the stresses on the polymer of the binding fibers 16 are smaller. In this alternative, the binding fibers 16 are for example formed on the bases of polypropylene, polyethylene, polyamide or co-polyethylene terephthalate, mixtures thereof, or their copolymers.

The benefit of operating with fibers based on a single polymer is their cost which is less by about 30% than the cost of two-component fibers.

The mass content of binding fibers 16, added to the total mass of the web 12, is non-zero and less than 15%, is advantageously comprised between 5% and 15%.

The binding fibers 16 are dispersed in the whole of the first web 12 and are present both in the velvet and in the sole, for example homogeneously.

The second web 18 is for example a spunbond (a term for which the meaning has been given in the preamble) including fibers 20 with a single component. Preferably, this non-woven spunbond is slightly consolidated by calendaring so as to leave maximum freedom to the filaments. This freedom is put to use during a needling step as this will be described later on.

The second web 18 is advantageously homogeneous (samples of for example 10 cm$^2$ taken anywhere in the web have a weight which is very close, the relative differences advantageously being less than 5%) and are anisotropic (the fibers are oriented in all the directions of the plane without preference given to any direction) along the extension plane P, which contributes to the good thermoformability of the piece 1. The second web 18 advantageously has a surface mass comprised between 50 g/m$^2$ and 200 g/m$^2$, for example of about 150 g/m$^2$.

As the second web 18 is homogenous and anisotropic, it has good thermoformability, even with a low weight, since it does not include any weakened area, unlike traditional needled fabric.

The fibers 20 have an undetermined length, if not infinite, in so far that they are extruded without any interruption and immediately coated. The fibers 20 are said to be "continuous", as opposed to shorter fibers 14, 16.

The fibers 20 are for example made from the same polymers as the fibers 14, i.e. preferentially in PET (polyethylene terephthalate). Alternatively, the fibers 20 are in polypropylene, in polyamide, or in polylactic acid. According to another embodiment, the fibers 14 and 20 are based on different polymers. For example, the fibers 14 may be in polyamide while the fibers 20 may be in PET.

The fibers 20 have a melting temperature T1.

Certain of the fibers 20 cross the binding layer 22 and are entangled with at least the fibers 14, 16 of the first layer 24 of the first web 12.

According to a particular embodiment (not shown), the fibers 20 jut out from the first layer 24 and contribute to the formation of velvet.

In every case, the first layer 24 of the first web 12, the binding layer 22 and the second web 18 form together a complete sole 28 from which escape some of the fibers 14, 16, and sometimes 20 in certain embodiments for forming the velvet.

The binding layer 22 in majority includes at least one thermoplastic polymer, advantageously co-polyethylene terephthalate, polyethylene, ethylene-vinyl acetate, polyamide, polypropylene or mixtures thereof.

The polymer of the binding layer 22 has a melting temperature TL, preferentially less by at least 30° C., than that of the fibers 20, and preferentially greater by at least 30° C., than the thermoforming temperature TF of the piece 1. A difference of at least 30° C. is greater than the generally accepted tolerances for conventional industrial thermoforming.

For example, if the forming temperature TF is 130° C. and if the fibers 20 are based on PET with a melting temperature T1 of 250° C., the polymer of the binding layer 22 preferentially has a melting temperature TL comprised between 160° C. and 220° C. For example, a polypropylene generally has a melting temperature of the order of 160° C. (for example Licocene® from Clariant); a polyamide 6 has a melting temperature of the order of 220° C.; or further a co-PET has a melting temperature easily adjustable in the required range.

The binding layer 22 is for example a film, or alternatively a non-woven, the film or the non-woven having optionally been partly perforated by needling, and then melted for partly impregnating the first web 12 and the second web 18 (FIG. 2). In the case when a non-woven of the spunbond type is used, the inter-fiber binding provided by the calendaring is significant, so that upon contact with the needles, during the assembling of the first web 12 and of the second web 18, the filaments making up the non-woven are broken and not carried away, in which case the filaments would pollute the velvet. Non-woven fabrics are preferable to films, although generally slightly more expensive. The non-woven fabrics contribute much more efficiently to the cohesion of the coating 10 and thus facilitate, as this will be seen, its extraction from a conveyor.

As described above, the binding layer 22 is crossed by certain of the fibers 20 because of needling having pushed the fibers 20 as far as into the first web 12 in order to form the complete sole 28.

The mass percentage of the binding layer 22 in the coating 10 is preferentially comprised between 15% and 30%.

The surface mass of the binding layer 22 is advantageously comprised between 80 g/m² and 200 g/m².

The binding layer 22 interpenetrates the first web 12 over a thickness E1, and the second web 18 over a thickness E2.

At the moment of the forming, for example at 130° C., the connections between the fibers 20 of the web 18 remain relatively rigid, since the melting temperature of the polymer making them up (stemming from the binding layer 22) is not attained. The resistance to elongation of the coating 10 is comparable with that of a latex web.

Thus, the use of the binding layer 22 based on a polymer having a melting temperature in the mentioned range gives the possibility of improving the resistance to abrasion of the coating 10, which is advantageously without any latex, while allowing the use as a sole of a spunbond with low weight and economical, since made up from one single polymer.

The product 20 is thus of low weight and has performances at least identical to the latex products.

Example 2

According to an alternative, the piece 1 has the following differences with respect to example 1 above.

According to this alternative, the second web 18 is a "conventional" web, i.e. not of the "spunbond" type, and the binding layer 22 is advantageously absent. The second web 18 is then of the same type as the first web 12.

The second web 18 for example comprises base fibers similar to the base fibers 14, and binding fibers structurally similar to the binding fibers 16 of Example 1, but comprising a polymer taken from the possibilities mentioned for the binding layer 22 of Example 1.

The binding fibers of Example 2 represent 25% to 75% by mass of the second web 18, for example about 50%. The binding fibers for example have a second melting point TL2 located in the specified range for the binding layer 22 of Example 1, i.e. greater than 30° C. at the forming temperature TF of the piece 1 and less by 30° C. to the melting temperature T2 of the base fibers of the second web 18.

The forming temperature TF is for example 130° C.

The binding fibers 16 of the first web 12 then advantageously represents between 5% and 15% by mass of the first web 12, for example about 10%.

The binding fibers 16 of the first web 12 are at least partly meltable at the forming temperature. For example they are in polyethylene, having a melting temperature of 110° C.

Example 2, although it does not allow the same gain in weight as Example 1, however remains of interest because of the allowed flexibility. Indeed, in example 2, the percentage of polymer responsible for the binding in the sole by the melting of the binding fibers of the layer 18 may be modified, while Example 1 applies a film with a predefined base weight. Thus, Example 2 is well adapted for strongly stretched pieces of equipment for which a relatively high base weight before forming the coating is necessary.

Method

Figure 3:
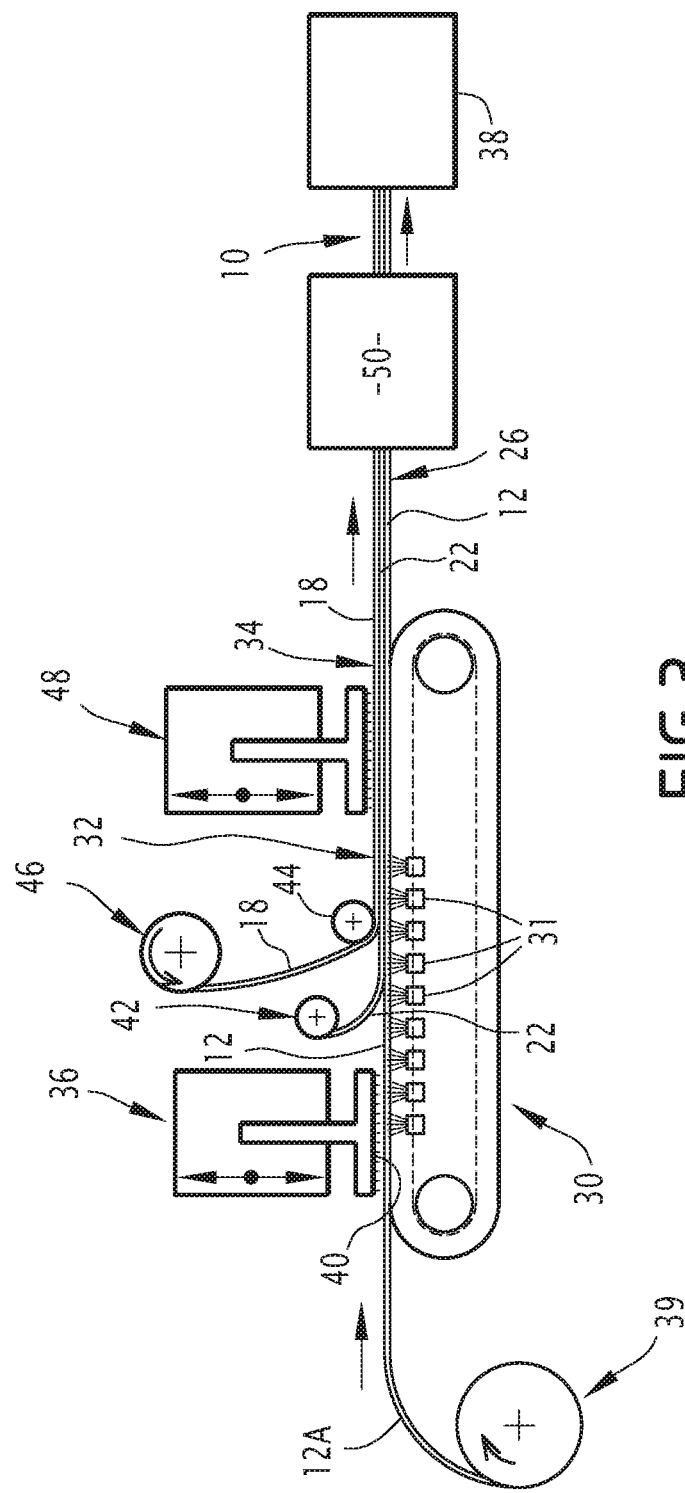
FIG. 3 is a schematic view of a facility applying a method according to an embodiment of the invention giving the possibility of producing the piece of equipment illustrated in FIG. 1.

A method according to an embodiment of the invention will now be described with reference to FIG. 3. It aims at making the coating 10 as described in Example 1 above.

The method includes, in this order, the following steps:
 obtaining the first web 12 on a conveyor 30 equipped with brushes 31, a second layer 26 intended to form the velvet being located on the side of the conveyor relatively to the first layer 24, depositing the binding layer 22 on the first layer 24 of the first web, depositing the second web on the binding layer and obtaining an assembly 32 including the first web, the binding layer and the second web, needling the assembly 32 on the conveyor so as to entangle fibers 20 of the second web with fibers 14, 16 of the first layer 24 of the first web and obtaining a needled assembly 34, and heating the needled assembly 34 to a heating temperature TC for melting the thermoplastic polymer of the binding layer 22, and obtaining after cooling, of the piece 1, in which the solidified binding layer 22 binds the first web and the second web mechanically together.

Optionally, the coating 10 is finally wound by means of a winder 38.

Subsequently, shearing of the velvet may take place.

The lower layer 5, for example a heavy mass, is added under the complete sole 28, the whole then being thermoformed at the forming temperature TF.

The step for obtaining the first web 12 comprises a sub-step for obtaining a pre-needled web 12A, a sub-step for bringing the pre-needled web on the conveyor 30 to the upstream side of a first needling head 36, and a needling sub-step.

The terms of "upstream" and "downstream" are meant relatively to the normal circulation direction in the manufacturing method disclosed herein.

Pre-needling (not shown) provides planar cohesion to the pre-needled web 12A, while allowing the formation of subsequent velvet. It comprises a board for conventional felting needles providing the web with a needling density greater than 100 cps/cm$^2$ and notably comprised between 100 cps/cm$^2$ and 200 cps/cm$^2$.

The pre-needled web 12A is for example unrolled from an unroller 39.

During the needling sub-step, the pre-needled web 12A passes between the first needling head 36 and the conveyor 30. Needles 40 pierce the pre-needled web 12A in order to form the first layer 24 and the second layer 26 and obtain the first web 12.

The first needling head 36 allows a needling density advantageously greater than 200 cps/cm$^2$ and notably comprised between 200 cps/cm$^2$ and 800 cps/cm$^2$, which gives the possibility of obtaining a desired velvet density between 0.03 and 0.06 g/cm$^3$.

The step for depositing the binding layer 22 is for example carried out by unrolling the binding layer 22 from an unroller 42 and applying it on the back of the first web 12 by means of at least one roller 44 located facing the conveyor 30.

The step for depositing the second web 18 is for example carried out by unrolling the second web from an unroller 46 and applying it on the binding layer 22 by means of the roller 44, so as to obtain the assembly 32 in which the first web 12, the binding layer 22 and the second web are superposed in this order away from the conveyor 30, and are not yet bound together.

Next, in the needling step, the assembly 32 passed between a second needling head 48 and the conveyor 30 so as to be needled and to form the needled assembly 34.

The second needling head 48 is for example similar to the first needling head 36. The second needling head 48 advantageously has needles adapted for penetrating as far as into the first layer 24 of the first web 12, but not further in. These needles are adapted for damaging as less as possible the binding layer 22, in order to limit the risks of polluting the velvet. For example they are of the "crown" type, i.e. having a single row of whiskers located at an equal distance from their tips.

The needling density provided by the second needling head 48 is selected to be sufficiently high so as to allow cohesion of the needled assembly 34, so as to be able to eradicate it from the brushes of the conveyor 30 and avoid delamination of the layers after thermoforming, but also not too high delamination in order to avoid too large deterioration of the binding layer 22. It is not sought here with priority to further feed the velvet, the desired density having been given during the first needling. For example, the needling density of the second needling head 48 is comprised between 20 and 50 counts/cm$^2$.

This second needling entangles the fibers 20 of the second web 18 with the fibers 14, 16 of the first web 12. This initiates the formation of the complete sole 28 and gives some mechanical cohesion to the needled assembly 34, so that the latter may be cleared away from the brushes 31 of the conveyor 30.

The conveyor 30 and the needling heads 36, 48 for example form a "Dilour IV" machine.

The heating step is for example carried out in an oven 50 adapted for melting at least partly the binding layer 22 and the binding fibers 16. An additional calendaring step may take place upstream or downstream from the oven.

The oven 50 is for example an oven with hot air or with infrared radiations.

The thermoplastic polymer of the binding layer 22 then penetrates into the first web 12 and into the second web 18.

The heating temperature TC is greater than the melting temperature of the polymer of the layer 22, and is for example comprised between 160° C. and 220° C. The polymer of the binding layer 22, by melting, penetrates into the thickness of the sole 28 and generates adhesive bonding points in the same way as would binding fibers.

The coating 10 is obtained at the outlet of the oven 50, after cooling. The lower layer 5 is then affixed to it, for example a heavy mass or a felt and the whole is thermoformed at the forming temperature TF so as to be placed in the vehicle.

At the moment of the thermoforming at 130° C., the adhesive bonding points generated during the heating step are not destroyed. The coating 10 retains a large portion of its resistance to elongation thereby ensuring homogeneous elongation of the coating even in the strongly stretched areas.

In order to produce the coating 10 according to Example 2, the step for depositing the binding layer 22 is advantageously omitted. The heating temperature TC is greater than the melting temperature TL2 of the binding fibers of the second web 18, which generates binding points which then resist during the thermoforming step.

Alternatives of the method

According to a first alternative, the first web 12 is obtained by a sub-method not requiring the needling carried out by the first needling head 36. In this case, the first needling head 36 is absent and the first web 12 is for example directly unrolled from the unroller 39 and brought on the conveyor 30.

The conveyor 30 and the second needling head 48 then form a simple "Dilour®" machine.

According to a second alternative, the web 18 of Example 1 is not a spunbond but a needled conventional web.

By means of the features described above, the coating 10 is obtained at a lower cost and with simple pieces of equipment. The coating 10 has a very satisfactory layer with a velvet aspect, good resistance to elongation, without any coating of latex, and its specific weight is generally small, advantageously between 400 and 500 g/m².

In Example 1, the single-component spunbond from which is made the second web 18 is much less expensive to produce than a two-component spunbond.

The elongation rate of the coating 10 at the forming temperature is comparable with the one obtained for pieces of equipment including latex. Further, the fibers of the first web 12 merge together. Upon cooling, the fibers of the first web 12 rebuild the bonds between the fibers of the velvet and the sole and further solidify the coating 10. Thus, the coating 10 retains its shape and has sufficient stiffness during its mounting in the vehicle.

In order to produce a piece 1 according to Example 2 above, the step for depositing the binding layer 22 is not carried out. In this case, as the binding layer 22 is not present, the risk of polluting the velvet during the needling step of the assembly 32 is inexistent. The needling density provided by the second needling head 48 advantageously varies between 200 and 800 cps/cm² and optionally contributes to feeding the velvet.

At the moment of the thermoforming which generally takes place between 130° C. and 160° C., a softening temperature of the lower layer 5, the polymer of the binding layer 22 (Example 1) or the polymer of the binding fibers of the second web 18 (Example 2) do not merge again. Thus, the adhesive bonding points generated during the heating step do not break, like a latex product, whence improved resistance to elongation.

The invention claimed is:

1. A method for manufacturing a piece of interior equipment of an automotive vehicle including the following steps, in this order:
    obtaining a first web of discontinuous fibers on a conveyor equipped with brushes, the first web including a first layer of fibers forming a sole, and a second layer of fibers intended to form a velvet and located on the side of the conveyor relatively to the sole,
    depositing a second web of fibers and obtaining an assembly including the first web and the second web,
    needling the assembly on the conveyor so as to entangle fibers of the second web with fibers of the sole of the first web and obtaining a needled assembly,
    heating the needled assembly to a heating temperature (TC) and obtaining a coating after cooling, and
    thermoforming the coating and a lower portion attached on the second web, the thermoforming being carried out at a forming temperature (TF), in order to obtain the piece,
    wherein:
    the second web comprises continuous fibers with a single component having a melting temperature (T1), the obtained assembly further including a binding layer deposited on the sole of the first web, the binding layer in majority including at least one thermoplastic polymer having a melting temperature (TL) greater than the forming temperature (TF) and less than the melting temperature (T1), the second web being deposited on the binding layer, the heating temperature (TC) being greater than the melting temperature (TL), or
    the second web comprises discontinuous fibers, the discontinuous fibers including base fibers and between 25% and 75% by mass of binding fibers at least partly meltable comprising a thermoplastic polymer having a melting temperature (TL2) greater than the forming temperature (TF), the base fibers having a melting temperature (T2) greater than the melting temperature (TL2) of said thermoplastic polymer, the heating temperature (TC) being greater than the melting temperature (TL2).

2. The method according to claim 1, wherein the melting temperature (TL) is greater than the forming temperature (TF) by at least 30° C., and less than the melting temperature (T1) by at least 30° C., the heating temperature (TC) being greater than the melting temperature (TL) by at least 30° C., or
    wherein the melting temperature (TL2) is greater than the forming temperature (TF) by at least 30° C., the melting temperature (T2) being greater than the melting temperature (TL2) of said thermoplastic polymer by at least 30° C., the heating temperature (TC) being greater than the melting temperature (TL2) by at least 30° C.

3. The method according to claim 1, wherein the first web comprises between 5% and 10% by mass of binding fibers at least partly meltable at said heating temperature (TC) and at said forming temperature (TF).

4. The method according to claim 3, wherein the binding fibers are fibers with two components, one of the two components having a melting temperature greater than the forming temperature (TF).

5. The method according to claim 1, wherein the step for obtaining the first web comprises a needling sub-step, before depositing the binding layer, in order to form the second layer of fibers.

6. The method according to claim 1, wherein the binding layer comprises a film or a non-woven, the film or the non-woven comprising the thermoplastic polymer.

7. The method according to claim 6, wherein the binding layer in majority comprises co-polyethylene terephthalate, polyethylene, ethylene-vinyl acetate, polyamide, polypropylene or mixtures thereof.

8. The method according to claim 6, wherein the fibers of the second web are made in polyethylene terephthalate, polypropylene, polyamide, polylactic acid, or mixtures thereof.

9. The method according to claim 1, wherein the binding fibers of the second web in majority comprise a polymer taken from among co-polyethylene terephthalate, polyethylene, ethylene-vinyl acetate, polyamide, polypropylene or mixtures thereof.

10. A piece of interior equipment of an automotive vehicle including:
    a first web of discontinuous fibers including a first layer of fibers forming a sole, and a second layer of fibers forming a velvet,
    a second web of fibers, fibers of the second web being entangled with fibers of the sole of the first web, and
    a lower portion attached on the second web,
    the piece further comprising a binding layer attached on the sole of the first web, the second web being attached on the binding layer, and in majority comprising continuous fibers with a single component having a melting temperature (T1), the binding layer in majority including at least one thermoplastic polymer having a melting temperature (TL) less than the melting temperature (T1), or
    the second web in majority comprising discontinuous fibers, the discontinuous fibers including base fibers and between 25% and 75% by mass of binding fibers at least partly meltable comprising a thermoplastic polymer having a melting temperature (TL2), the base fibers having a melting temperature (T2) greater than the melting temperature (TL2) of said thermoplastic polymer.

\* \* \* \* \*